US 6,687,979 B2

(12) United States Patent
Bucey et al.

(10) Patent No.: US 6,687,979 B2
(45) Date of Patent: Feb. 10, 2004

(54) SYSTEM FOR MANUFACTURING A CIRCULAR PRIMARY SURFACE RECUPERATOR

(75) Inventors: Charles W. Bucey, San Diego, CA (US); Robert M. Jones, Metamora, IL (US); Steven W. Clayton, Metamora, IL (US); Chad L. Miars, Peoria, IL (US); Douglas R. Ervin, Metamora, IL (US)

(73) Assignee: Solar Turbines Inc, San Diego, CA (US)

( * ) Notice: Subject to any disclaimer, the term of this patent is extended or adjusted under 35 U.S.C. 154(b) by 0 days.

(21) Appl. No.: 10/012,860

(22) Filed: Nov. 30, 2001

(65) Prior Publication Data

US 2003/0101588 A1 Jun. 5, 2003

(51) Int. Cl.$^7$ ................................................ B23P 15/26
(52) U.S. Cl. ........................... 29/727; 29/726; 29/33 G; 29/822; 29/890.034
(58) Field of Search ....................... 29/890.034, 890.03, 29/726, 727, 33 G, 795, 822; 165/166

(56) References Cited

U.S. PATENT DOCUMENTS

| 5,060,721 A | | 10/1991 | Darragh |
| 5,918,368 A | * | 7/1999 | Ervin et al. ............... 29/890.03 |
| 6,112,403 A | * | 9/2000 | Ervin et al. .................... 29/726 |
| 6,158,121 A | * | 12/2000 | Ervin et al. ............ 29/890.034 |
| 6,308,409 B1 | * | 10/2001 | Bucey et al. ........... 29/890.034 |
| 6,520,002 B2 | * | 2/2003 | Bucey et al. .................. 73/40 |

* cited by examiner

Primary Examiner—Irene Cuda Rosenbaum
(74) Attorney, Agent, or Firm—Larry G Cain

(57) ABSTRACT

A system is disclosed to manufacture a recuperator core. The core is made up of a plurality of cells and an inner sealing member. A manufacturing system has an input end, an assembly station having a lower or inner chucking portion and an upper portion, and a welding station. The lower or inner chucking portion is movable between a lower position and an upper position and has a retracted position and an expanded position. The upper portion is movable between a loading position and a clamping position and is rotatable between a first position and a second position. The welding station performs a tack welding operation and a lineal welding operation.

11 Claims, 7 Drawing Sheets

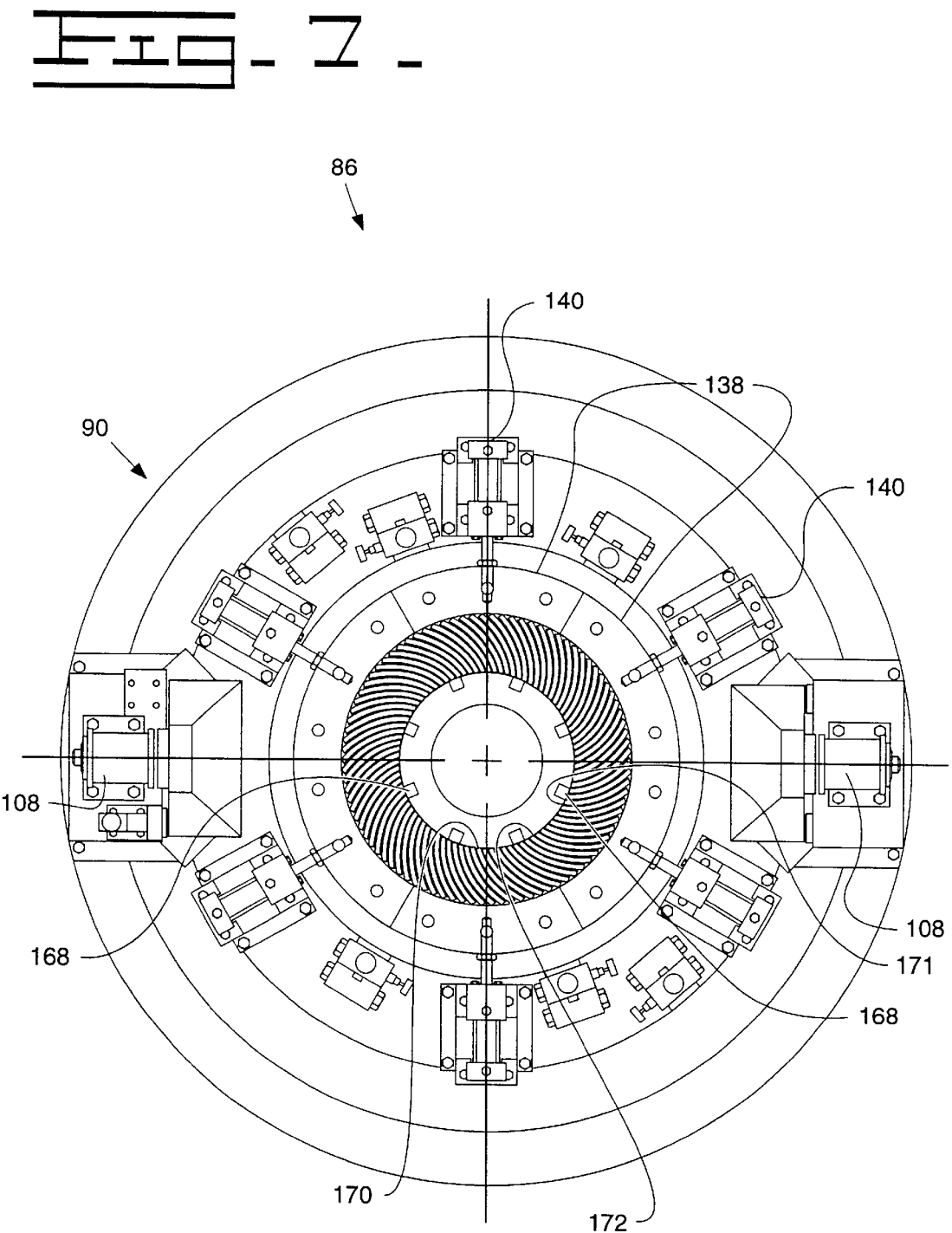

SYSTEM FOR MANUFACTURING A CIRCULAR PRIMARY SURFACE RECUPERATOR

TECHNICAL FIELD

This invention relates generally to a heat exchanger or more explicitly to a circular recuperator and more particularly to an apparatus and method for assembling the circular recuperator.

BACKGROUND

Many gas turbine engines use a heat exchanger or recuperator to increase the operation efficiency of the engine by extracting heat from the exhaust gas and preheating the intake air. Typically, a recuperator for a gas turbine engine must be capable of operating at temperatures of between about 500 degrees C. and 700 degrees C. and internal pressures of between approximately 450 kPa and 1400 kPa under operating conditions involving repeated starting and stopping cycles.

Many recuperators are of a primary surface construction. In a primary surface recuperator, a plurality of sheets are stacked in a spaced apart configuration to form a cell. The spacing therebetween form a plurality of donor passages and a plurality of recipient passages. In many operations, the hot exhaust gas is passed through the donor passages and an atmospheric temperature intake air is passed through the recipient passages. Heat from the hot exhaust is transferred through the sheet and absorbed by the cooler intake air. Thus, thermal energy from the exhaust gas is extracted and conducted to the intake air increasing the efficiency of the engine.

In many applications the primary surface sheet used in forming the cell is very thin, flimsy and difficult to maintain a uniform cross sectional area of the passages between sheets. To enhance the rigidity of the thin sheets, the sheets are formed into an accordion type configuration forming peaks or crests and valleys forming a plurality of upwardly and downwardly opening, transversely extending, relatively deep grooves being relatively closely spaced and having substantially vertical side walls or fins. In forming a recuperator using such sheets, the peeks of alternate sheets are aligned and the valleys of alternate sheets are aligned to form the donor passages and the recipient passages. Additionally, many of the sheets are formed with a serpentined configuration to enhance a controlled turbulent which increases heat conductivity and resulting efficiency. In manufacturing such recuperators, the component parts are fixedly attached together by a welding process to prevent leakage from the respective donor passages and recipient passages.

U.S. Pat. No. 5,060,721 issued on Oct. 29, 1991 to Charles T. Darragh discloses an example of one such recuperator. The recuperator disclosed in this patent has a circular configuration. The recuperator has a plurality of cell made from a pair of primary surface sheets, a plurality of spacer bars and a plurality of guide strips. The component parts are welded together to form the recuperator. The welding of these thin sheet and component parts into a cell having a sealed interface is difficult to accomplish in a cost effective and efficient manner.

During the assembly of the cells and the recuperator, the interface of the components are positioned one with respect to another in a preestablished relationship and are welded together. The effectiveness of the positioning and holding process during the welding process used to form the cells is in many instances dependent on the ability to maintain the relationship of the components one to another. The result of maintaining the components relationship may results a defective weld and thus a defective recuperator. For example, in positioning of the cells the components relationship can result in an excessive gap or misalignment. Thus, the resulting weld can be defective and leakage between adjacent cells can occur. Thus, an effective and efficient process is needed to insure the position and location of the component relationship to insure a functional recuperator.

The present invention is directed to overcome one or more of the problems as set forth above.

SUMMARY OF THE INVENTION

In one aspect of the invention an apparatus for manufacturing a recuperator core is disclosed. The recuperator core is made from a plurality of components. The plurality of components include a plurality of cells and an inner sealing member having a first end and a second end. The apparatus has a lower or inner chucking portion being movable between a lower position and an upper position. The lower or inner chucking portion is movable between a retracted position and an expanded position. And, the lower or inner chucking portion positions the inner sealing member relative to the plurality of cells. An upper portion is positioned about the lower or inner chucking portion and defines a first side and a second side. The upper portion is rotatable between a first position having the first side up and a second position having the seconds side up. The upper portion is movable between a loading position and a clamping position. And, the upper portion positions the plurality of cells relative to the inner sealing member. And, a welding portion defines a first weld positioned at an interface of the first end of the inner sealing member and the plurality of cells and a second weld positioned at an interface of the second end of the inner sealing member and the plurality of cells.

In another aspect of the invention a method of manufacturing a recuperator core is disclosed. The recuperator core includes a plurality of cells and an inner sealing member having a first end and a second end. The method of manufacturing the recuperator core has the steps of: positioning a lower or inner chucking portion in an upper position; aligning the first end of the inner sealing member with an end of the lower of inner chucking portion; expanding the lower or inner chucking portion into an expanded position; positioning an upper portion in a first position and in a loading position; placing a preestablished quantity of the plurality of cells in the upper portion; moving the upper portion from the loading portion into at least one of a low pressure clamping position, a medium pressure clamping position and a high pressure clamping position; aligning the plurality of cells into a preestablished configuration; welding an interface of the plurality of cells and the first end of the inner sealing member; rotating the upper portion into a second position; welding an interface of the plurality of cells and the second end of the inner sealing member; retracting the lower or inner chucking portion from the expanded position to a retracted position; moving the upper portion from the one of the low pressure clamping position, the medium pressure clamping position and the high pressure clamping position into the loading position; and removing the manufactured recuperator core.

In another aspect of the invention a manufacturing system is adapted for making a finished circular recuperator core.

The recuperator core defining an axis "A" and is make up of a plurality of finished cells and an inner sealing member. The inner sealing member or ring has a circular configuration and defines a first end and a second end. The manufacturing system has an input end having a supply of the plurality of finished cells provide thereto. An assembly station has a table and defines an axis coinciding with the axis "A" of the circular recuperator core during the manufacturing of the recuperator core. The table includes a lower or inner chucking portion having an axis coinciding with the axis "A" and is movable between a lower position and an upper position. An upper portion is positioned about the lower or inner chucking portion and has a stacking portion being movable between a loading position and a clamping position. The upper portion is rotatable between a first position and a second position. A welding station is operatively connected to the assembly station. The welding station is capable of performing a tack welding operation and a lineal welding operation. An output end has a location for placing the finished circular recuperator core after the assembly and welding thereof.

BRIEF DESCRIPTION OF THE DRAWINGS

FIG. 7 is a detailed view of a portion of the manufacturing system.

DETAILED DESCRIPTION

Figure 1:
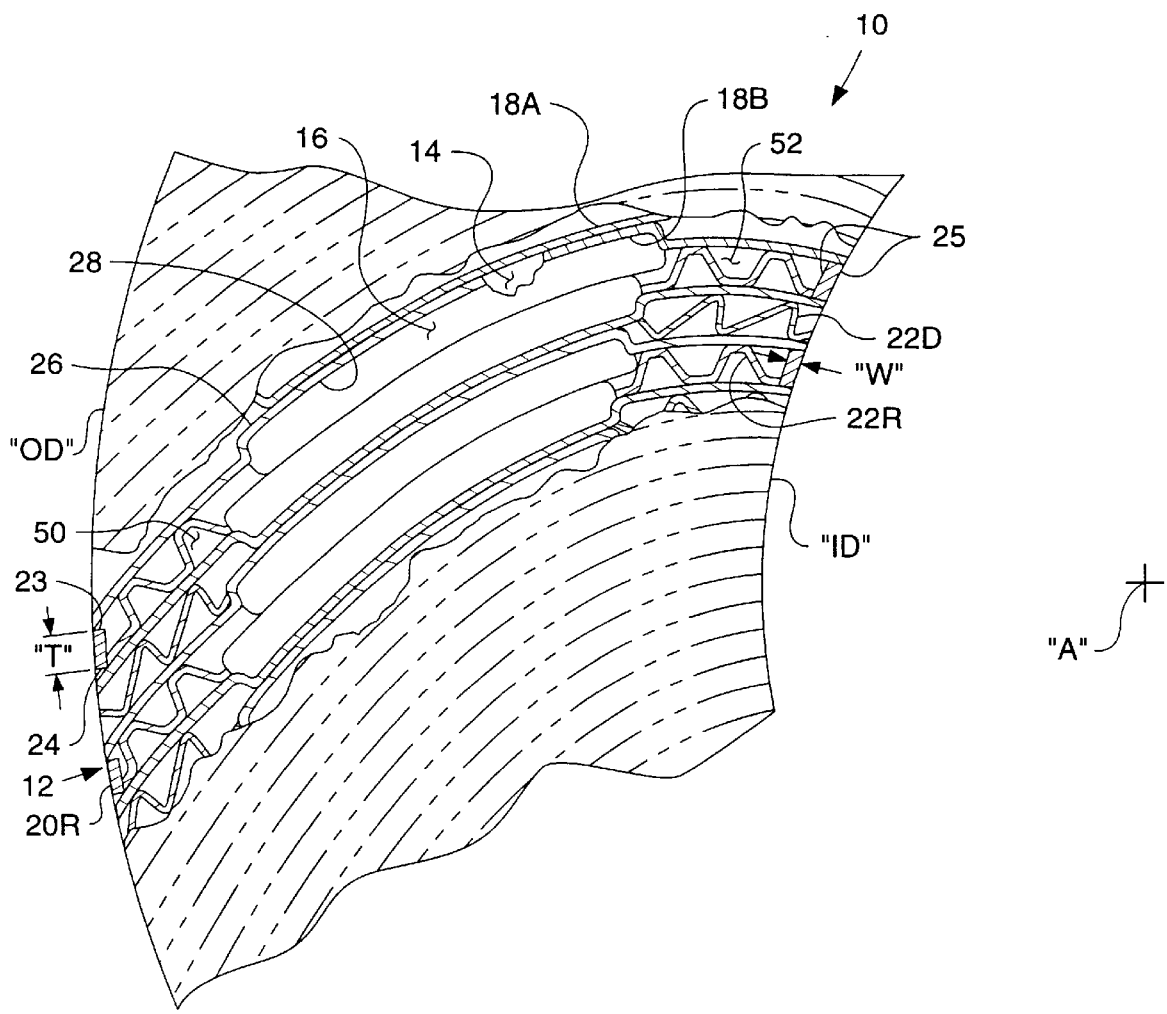
FIG. 1 is a sectional view of a recuperator taken through a plurality of cells.

As best shown in FIG. 1, a circular recuperator core 10 is formed from a plurality of cells 12 and defines an axis "A". The recuperator core 10 has a plurality of donor passages 14 and a plurality of recipient passages 16 defined therein. Each of the plurality of cells 12 is made from a plurality of primary surface sheets 18. In this application, a pair of the plurality of primary surface sheets 18 designated as 18A and 18B are used in making each cell 12. A plurality of spacer bars 20 and a plurality of guide vanes 22 are also used in making the cell 12. The plurality of spacer bars 20 are divided into a plurality of donor spacer bars 20D, best shown in FIG. 2, and a plurality of recipient spacer bars 20R. And, each of the plurality of spacer bars 20 has a preestablished thickness "T" extending between a first surface 23 and a second surface 24 and a preestablished width "W" extending between a pair of edges 25. The plurality of guide vanes 22 are divided into a donor guide vane 22D having an inlet guide vane and an outlet guide vane and a recipient guide vane 22R having an inlet guide vane and an outlet guide vane.

Figure 2:
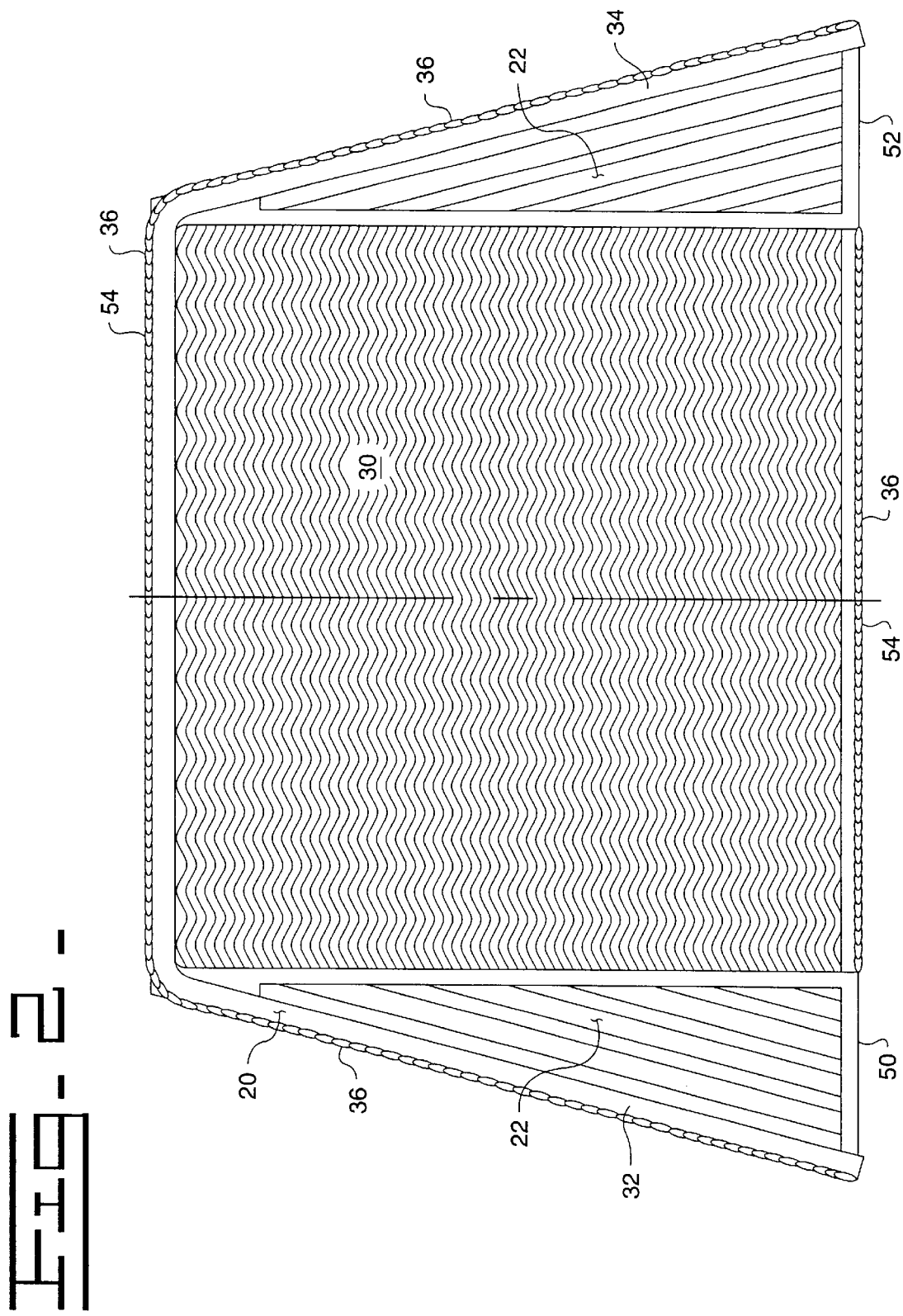
FIG. 2 is a view of one of the plurality of cells partially assembled and used in making the plurality of cells.

As further shown in FIG. 2, each of the pair of primary surface sheets 18A,18B is pleated and defines a donor side 26 and a recipient side 28. Each of the plurality of primary surface sheets 18A and 18B has a center portion 30, a first wing portion 32 and a second wing portion 34. In this application, the center portion 30 has a preformed serpentined rectangular configuration and each of the first and second wing portions 32,34 has a flattened generally triangular configuration. As an alternative, other configurations could be used without changing the jest of the invention. Each of the plurality of primary surface sheets 18A and 18B define a plurality of edges 36. The plurality of spacer bars 20 are position on the primary surface sheet 18A and 18B alone the respective one of the plurality of edges 36 in a plurality of precise preestablished locations. As shown in FIGS. 1 and 2, one of the pair of primary surface sheets 18A and 18B on the recipient side 28 has the recipient inlet guide vane 22R attached thereto in the first wing portion 32 in a precise preestablished location. And, the same one of the pair of primary surface sheets 18A and 18B on the recipient side 28 has the recipient outlet guide vane 22R attached thereto in the second wing portion 34. Interposed the first wing portion 32 of the pair of primary surface sheets 18A and 18B is a recipient inlet passage 50 and interposed the second wing portion 34 of the pair of primary surface sheets 18A and 18B is a recipient outlet passage 52. And, as further shown in FIG. 2, a plurality of welds 54 are used to complete the assembly of each of the plurality of cells 12. During the manufacturing of the plurality of cells 12, each of the plurality of cells 12 is formed in an arcuate configuration prior to being assembled into the circular recuperator core 10 which defines an inner diameter portion "ID" and an outer diameter portion "OD".

Figure 3:
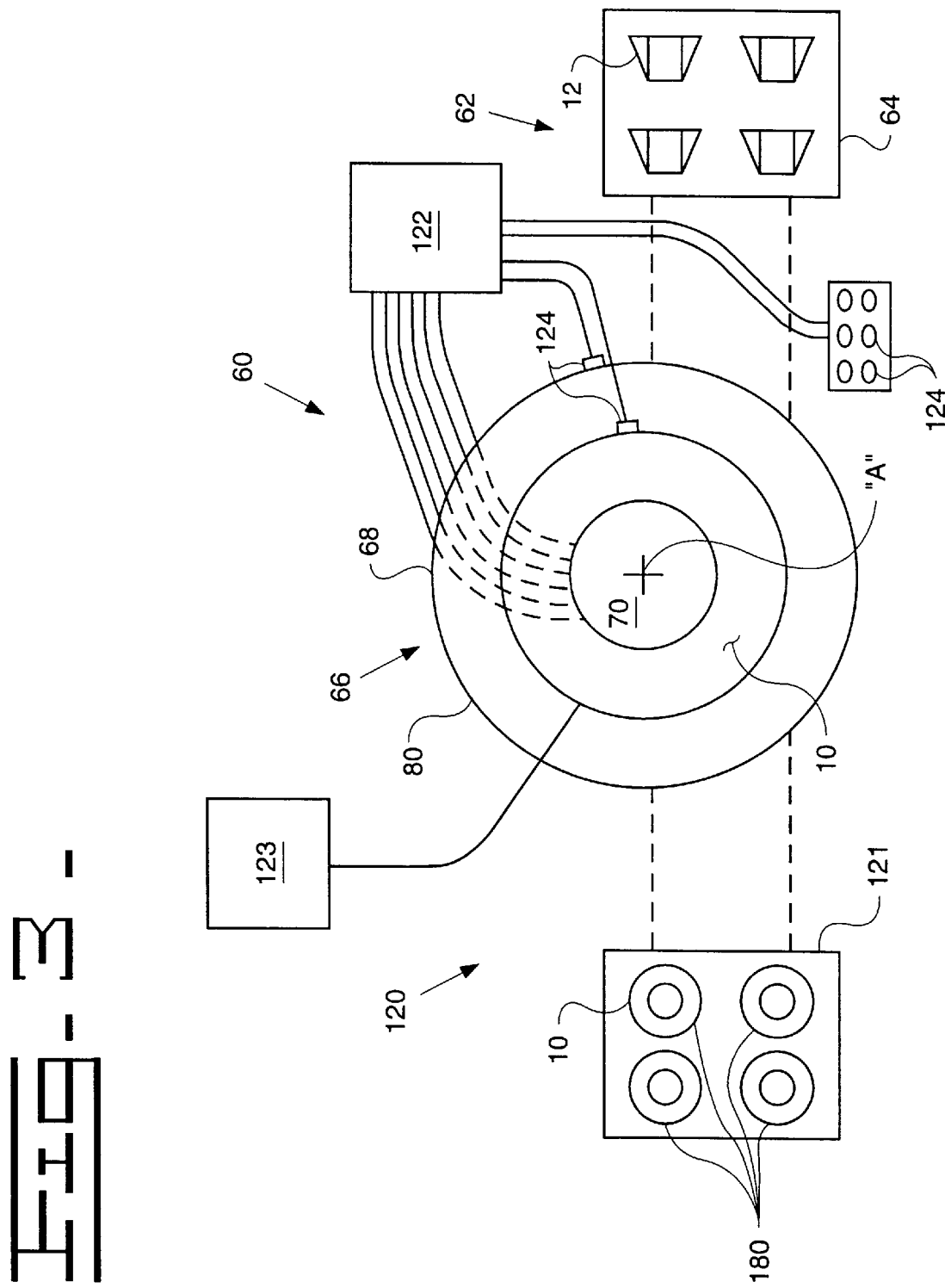
FIG. 3 is a schematically representation of a manufacturing system or line.

As shown in FIG. 3, a manufacturing system 60 is used to manufacture the recuperator 10. The system 60 has an input end 62 having a tub or container 64 in which is positioned the plurality of cells 12 in a finished configuration. The system 60 also has an assembly station 66 centered about an axis which during the manufacturing of the circular recuperator core 10 coincides with the axis "A" of the recuperator 10. The assembly station 66 includes a table 68. The table 68, which is shown in greater detail in FIGS. 4, 5, 6 and 7, has a lower or inner chucking portion 70 which is movable between a lower position 72 and an upper position 74. The table 68 also has an upper portion 80 which has a stacking portion 82 being movable between a loading position 84 and a clamping position 86. The clamping position 86 is movable between a low pressure clamping position 88, shown in FIG. 4, a medium pressure clamping position 90, shown in FIG. 6, and a high pressure clamping position 92, shown in FIG. 7. The upper portion 80 of the table 68 is also rotatable between a first position 100 having a first side 102 of the upper portion 80 up and a second position 104, shown partially and in phantom in FIG. 4, having a second side 106 of the upper portion 80 up. The upper portion 80 is moved between the first position 100 and the second position 104 by a hydraulic motor 108. The upper portion 80 is lockable in each of the first position 100 and the second position 104. The lower or inner chucking portion 70 is expandable between a retracted position 116 and an expanded position 118. The lower or inner chucking portion 70 is moved between the retracted position 116 and the expanded position 118 by a hydraulic cylinder 119. The system 60, as shown in FIG. 3, has an output end 120 having a tub or container 121 in which is positioned the circular recuperator 10 after being welded. The system 66 further has a source of hydraulic pressure 122 and a welding station or portion 123 operatively connected therewith.

Figure 4:
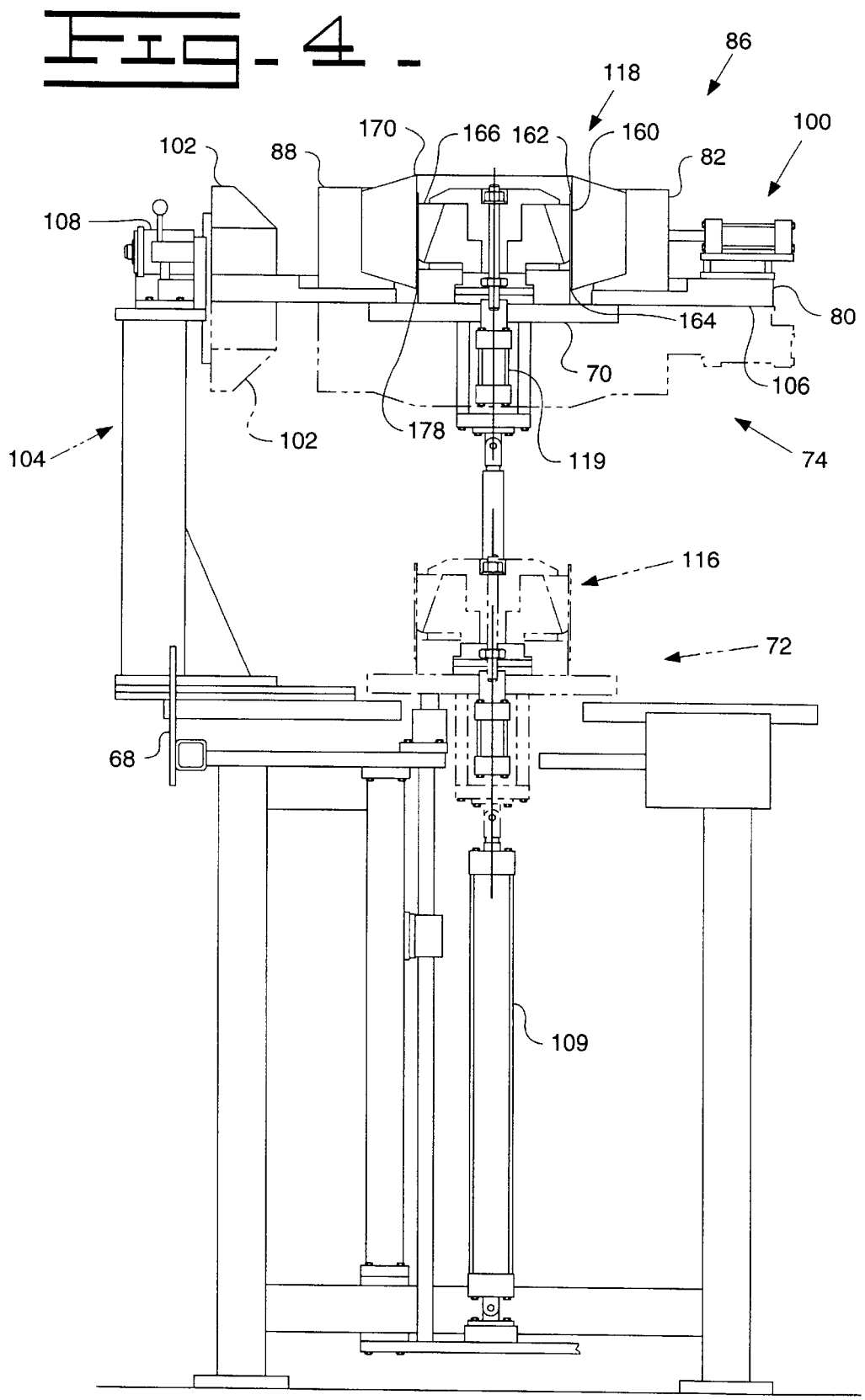
FIG. 4 is a detailed view of a portion of the manufacturing system.
Figure 5:
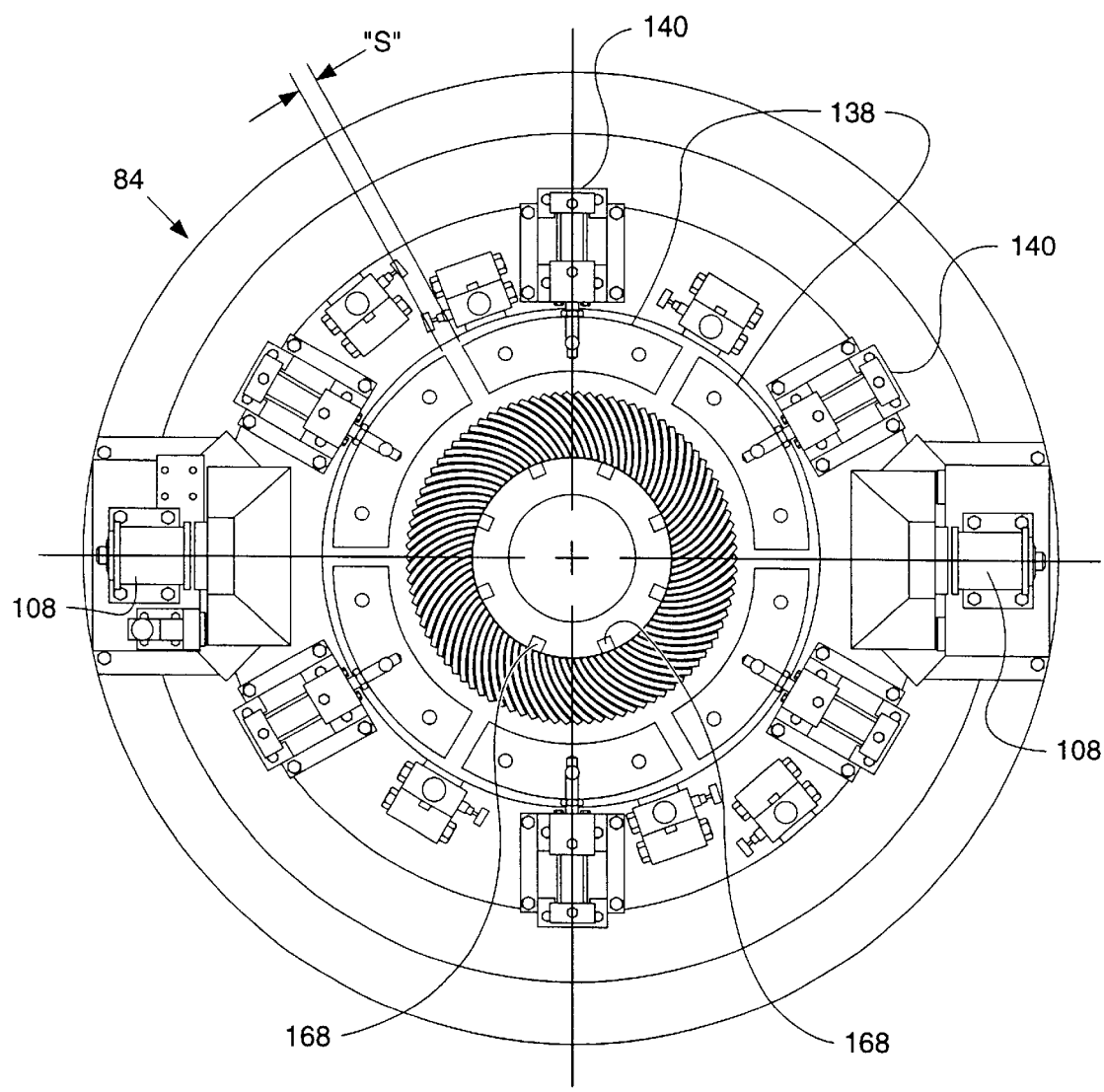
FIG. 5 is a detailed view of a portion of the manufacturing system.
Figure 6:
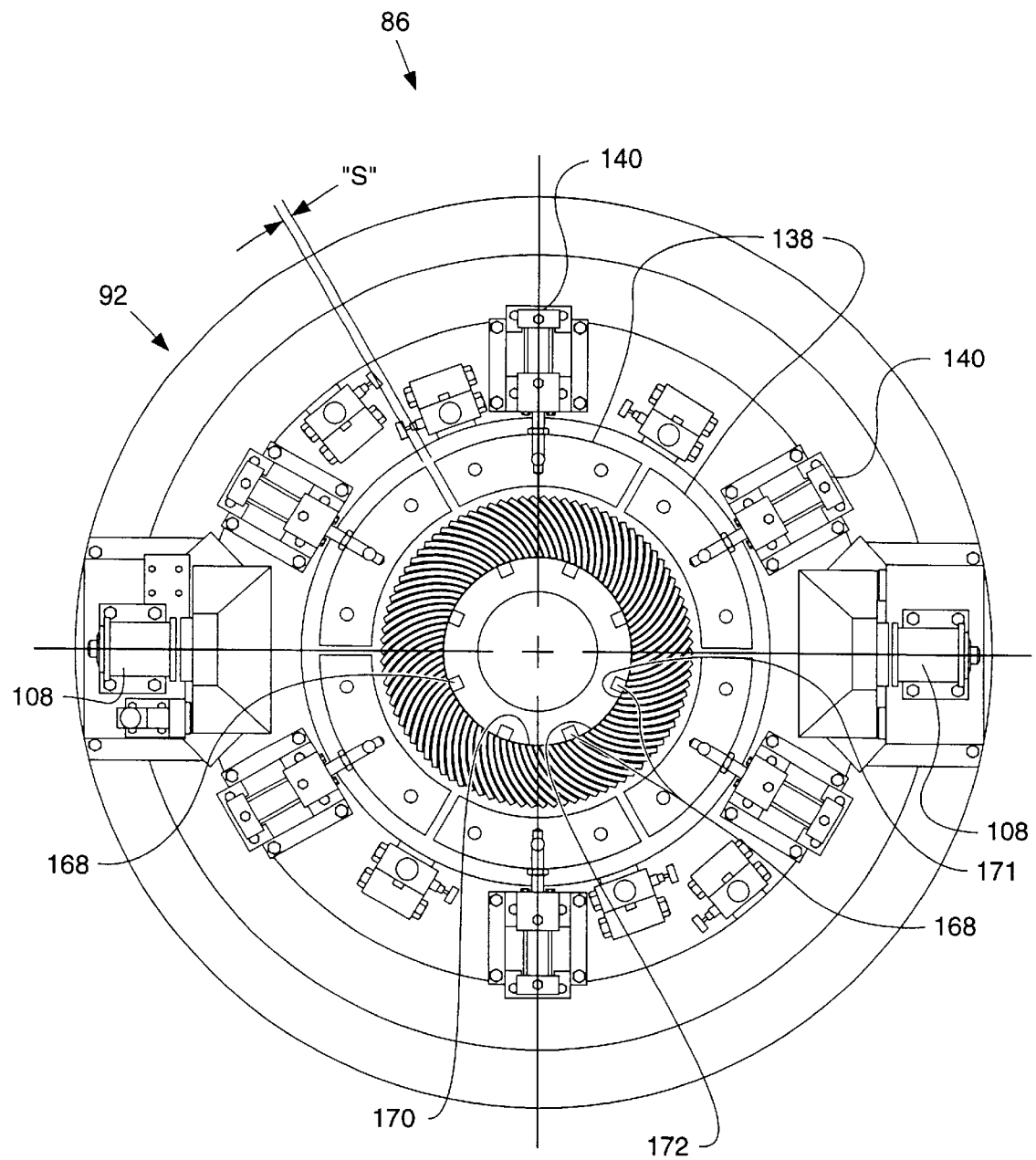
FIG. 6 is a detailed view of a portion of the manufacturing system.

In FIG. 4, shown in phantom, an operator has actuated one of a plurality of safety switches and switches 124 and the hydraulic cylinders 108 moves the lower or inner chucking portion 70 into the lower position 72 and the hydraulic cylinder 119 moves the lower or inner chucking portion 70 into the retracted position 116. As shown in FIG. 4, another one of the plurality of switches 124 actuates a cylinder 109 into the extended position 118 with the lower or inner chucking portion 70 in the upper position 74. As shown in FIGS. 5, 6 and 7, the upper portion 80 of the table 68 is constructed of a plurality of segments 138 which are movably actuated about the axis by the operator controlling another one of the plurality of switches 124 which actuates a plurality of cylinder 140. As shown in FIG. 5, with the plurality of cylinders 140 in a retracted position the plurality of segments are moved into the loading position 84 and the plurality of segments 138 have a space "S" therebetween. With the plurality of cylinders 140 at least partially extended the stacking portion 82 of the upper portion 80 of the table 68 is in the clamping position 86 and depending on the one of the plurality of switches 124 actuated by the operator the pressure applied to the plurality of cylinders 140 is in one of the low pressure, medium pressure and high pressure positions 88,90,92. And, the space "S" between the plurality of segments 138 varies depending on the pressure from a large space "S" to a minimal space "S" respectively.

As further shown in FIG. 4, an inner sealing member or ring 160 is positioned about the lower or inner chucking portion 70. The inner sealing ring 160 has a generally cylindrical configuration which extends between a first end 162 and a second end 164. The inner sealing ring 160 has a preestablished thickness and a preestablished outer diameter. The inner sealing ring 160 has the first end 162 positioned slightly above or near flush with an end 166 of the lower or inner chucking portion 70. The end 166 of the lower or inner chucking portion 70 has a plurality of recesses 168 therein. In this application, there are six equally spaced recesses 168. By actuating one of the plurality of switches 124, the lower or inner chucking portion 70 is positioned in the upper position 74 and in the expanded position 118 maintaining the inner sealing ring 160 with respect to the end 166, centering the inner sealing ring 160 about the axis "A", and maintaining the generally cylindrical configuration of the inner sealing ring 160. As shown in FIG. 4, another of the plurality of switches 124 is actuated and the upper portion 80 of the table 68 is moved into the clamping position 86. With the proper one of the plurality of switches 124 actuated, the low pressure clamping position 88 of the clamping position 86 is actuated and the space "S" between the plurality of segments 138 is reduced. The operator views the position of the plurality of cells 12 insuring proper alignment. And, if the plurality of cells 12 are not properly aligned the operator properly aligns the plurality of cells 12 such as by tapping with a soft hammer. Next, as shown in FIG. 6, the operator actuates the proper one of the plurality of switches 124 actuating the medium pressure clamping position 90 of the clamping position 86. Thus, the space "S" between the plurality of segments 138 is further reduced. Again, the operator views the position of the plurality of cells 12 insuring proper alignment. And, if the plurality of cells 12 are not properly aligned the operator properly aligns the plurality of cells 12 such as by tapping with a soft hammer. And, as shown in FIG. 7, the operator actuates the proper one of the plurality of switches 124 actuating the high pressure clamping position 92 of the clamping position 86 is actuated and the space "S" becomes minimal. The operator views the position of the plurality of cells 12 insuring proper alignment. And again, if the plurality of cells 12 are not properly aligned the operator properly aligns the plurality of cells 12 such as by tapping with a soft hammer. If during the steps of actuating the low pressure clamping position 88, the medium pressure clamping position 90 and the high pressure clamping position 92 the plurality of cells 12 will not properly align, the operator reduces the pressure and repeats the appropriate step or steps from low pressure clamping position 88, medium pressure clamping position 90 and high pressure clamping position 92. In this application, the cylinders 109,119 and the plurality of cylinders 140 are hydraulically actuated but as an alternative can use a pneumatic or other power source.

With the plurality of cells 12 properly positioned the welding station 123 is employed. The welding station 123 may utilize an operator and be manually applied or an automated system can be employed. A first weld 170 is deposited along an entire axial length of the interface of the inner diameter portion "ID" of the plurality of cells 12 and the first end 162 of the inner sealing ring 160. The first weld 170 fixedly connects the plurality of cells 12 with the inner sealing ring 160 in a predefined relationship. The first weld 170 is accomplished by the following steps: first, a tack weld operation 171 is applied to the inner diameter position "ID" at the plurality of recesses 168; actuating the proper one of the plurality of switches 124 and lowering the lower or inner chucking portion 70 at least to a position in which a lineal weld operation 172 is applied to the entire axial length is feasible and such a welding technique does not contaminate or add weld to the lower or inner chucking portion 70. The operator actuates one of the plurality of switches 124 and the upper portion 80 is unlocked and moved from the first position 100 to the second position 104 by the motor 108. One of the plurality of switches 124 is actuated and the lower or inner chucking portion 70 is moved into the upper position 74 and is expanded into the expanded position 118. Thus, the proper relative position of the plurality of cells 12 and the inner sealing ring 160 is again attained. A second weld 178 is deposited along an entire axial length of the interface of the inner diameter portion "ID" of the plurality of cells 12 and the second end 164 of the inner sealing ring 160. The second weld 178 fixedly connects the plurality of cells 12 with the inner sealing ring 160 in a predefined relationship. The second weld 178 is accomplished by the following steps: first, tack welding the inner diameter portion "ID" at the plurality of recesses 168; actuating the proper one of the plurality of switches 124 and lowering the lower or inner chucking portion 70 at least to a position in which welding the entire axial length is feasible and such a welding technique does not contaminate or add weld to the lower or inner chucking portion 70.

A retainer or a plurality of retainers 180 can be placed about the outer diameter portion "OD" of the plurality of cells 12 after the first weld 170 and the second weld 178 are completed to structurally maintain the recuperator core 10 in tack.

The structural integrity and preestablished configuration of the circular recuperator core 10 is maintained by using the manufacturing system 60. For example, the predetermined quantity of individual arcuate plurality of cells 12 are loosely position in the upper portion 80 of the table 68 about the inner sealing ring 160 and the lower or inner chucking portion 70. The upper portion 80 is systematically moved into the clamping position 86 and the plurality of cells 12 are welded to the inner sealing ring 160 at each end 162,164. Thus, the circular recuperator core 10 is effectively and efficiently formed in its predefined configuration.

Industrial Applicability

In operation after completing the making of the individual cell 12 of the plurality of recuperator cells, the supply of individual ones of the plurality of recuperator cells 12 are positioned in the tub or container 64. The operator visually surveys the manufacturing system 60 including the assembly station 66. As shown in FIG. 4, the operator actuates one of the plurality of switches 124 and with the stacking portion 82 of the upper portion 80 in the loading position 84 and the lower or inner chucking portion 70 moved into the lower position 72 the operator positions the inner sealing ring 160 about the lower or inner chucking portion 70 and the lower or inner chucking portion 70 is expanded to the expanded position 118. And, the end 162 of the inner sealing mechanism or ring 160 is positioned correctly with respect to the end 166 of the lower or inner chucking portion 70.

As shown in FIG. 5, a portion of the plurality of cells 12 are loosely positioned or stacked in the upper portion 80. As shown in FIG. 4, one of the plurality of switches 124 is actuated and the stacking portion 74 of the upper portion 80 is moved from the loading position 84 to the clamping position 86. The first phase of the clamping position 86 is moved into the low pressure clamping position 88 and the space "S" is partially closed. The operator surveys the relative position of the individual ones of the plurality of cells 12 and if necessary aligns the relative position of the plurality of cells 12. In most situations a soft hammer is used to correct the relative position of the plurality of cells 12. With the relative position of the individual ones of the plurality of cells 12 appropriately aligned the clamping position 86 is moved into the medium pressure clamping position 90 and the space "S" is further reduced, as shown in FIG. 6. The operator surveys the relative position of individual ones of the plurality of cells 12 and if necessary aligns the relative position of the plurality of cells 12. With the relative position of the individual ones of the plurality of cells 12 appropriately aligned the clamping position 86 is moved into the high pressure clamping position 92 and the space "S" is reduced to the minimal space, as shown in FIG. 7.

Thus, with the configuration of the recuperator core 10 maintained within the work station 66 the first weld 170 is applied to the interface of the first end 162 of the inner sealing ring 160 and the inner diameter portion "ID" of the plurality of cells 12. For example, the first weld 170 is accomplished as follows: the inner diameter "ID" of the recuperator core 10 and the first end 162 of the inner sealing ring 160 at the plurality of recesses 168 are tack welded 171; and the lower or inner chucking portion 70 is lowered and the first weld 170 is completed along the entire axial length of the interface between the inner diameter portion "ID" of the recuperator core 10 and the first end 162 of the inner sealing ring 160 with the lineal weld operation 172. The upper portion 80 is unlocked and moved from the first position 100 to the second position 104 and the lower or inner chucking portion 70 is moved to the upper position 74. The upper portion 80 is locked in the second position 104 and the lower or inner chucking portion 70 is expanded into the expanded position 118. Thus, the second weld 178 is deposited along the entire axial length of the interface of the inner diameter portion "ID" of the plurality of cells 12 and the second end 164 of the inner sealing ring 160. For example, the second weld 178 is accomplished as follows: the inner diameter portion "ID" and the second end 164 of the inner sealing ring 160 at the plurality of recesses 168 are tack welded 171; and the lower or inner chucking portion 70 is lowered and the second weld 178 is completed along the entire axial length of the interface between the inner diameter portion "ID" of the recuperator core 10 and the second end 164 of the inner sealing ring 160 with the lineal weld operation 172. The first weld 170 and the second weld 178 fixedly connects the plurality of cells 12 with the inner sealing ring 160 in their predefined relationship forming the recuperator core 10.

The upper portion 80 is moved into the loading position 84 and the recuperator core 10 is removed therefrom and deposed into the tube 121. The upper portion 80 is unlocked and is rotated into the first position 100. The upper portion 80 is locked and ready for the next cycle. To insure that the recuperator core 10 is maintained in it circular configuration at least one of the plurality of retainers 180 is positioned about the outer diameter portion "OD" of the recuperator core 10 prior to placing in the tube 121.

Other aspects, objects and advantages of this invention can be obtained from a study of the drawings, the disclosure and the appended claims.

What is claimed is:

1. An apparatus for manufacturing a recuperator core, said recuperator core being made from a plurality of components, said plurality of components including a plurality of cells and an inner sealing member having a first end and a second end; said apparatus comprising:

a lower or inner chucking portion being movable between a lower chucking position and an upper chucking position, said lower or inner chucking portion being movable between a retracted chucking position and an expanded chucking position, and said lower or inner chucking portion positioning said inner sealing member relative to said plurality of cells;

an upper chucking portion being position about said lower or inner chucking portion and defining a first side and a second side, said upper portion being rotatable between a first position having said first side up and a second position having said second side up, said upper portion being movable between a loading position and a clamping position, and said upper portion positioning said plurality of cells relative to said inner sealing member; and a welding portion defining a first weld position and a second weld position, said first weld position being at an interface of said first end of the inner sealing member and the plurality of cells and a second weld positioned, said second weld position being at an interface of said second end of the inner sealing member and the plurality of cells.

2. The apparatus for manufacturing a recuperator core of claim 1 wherein said manufacturing apparatus making a recuperator core having a circular configuration defining an axis "A".

3. The apparatus for manufacturing a recuperator core of claim 2 wherein said lower or inner chucking portion defines an axis and said axis coinciding with said axis "A" of said recuperator core, said upper chucking portion defines a second axis coinciding with said axis "A" of said recuperator core.

4. The apparatus for manufacturing a recuperator core of claim 1 wherein said upper chucking portion being made of a plurality of segments, said plurality of segments defining a space "S" therebetween.

5. The apparatus for manufacturing a recuperator core of claim 4 wherein said clamping position of said upper chucking portion includes a low pressure clamping position, a medium pressure clamping position and a high pressure clamping position.

6. The apparatus for manufacturing a recuperator core of claim 5 wherein said space "S" is reduced progressively between said low pressure clamping position, said medium clamping position and said high pressure clamping position respectively.

7. The apparatus for manufacturing a recuperator core of claim 1 wherein said upper portion being movable between said first position said second position using a hydraulic cylinder.

8. The apparatus for manufacturing a recuperator core of claim 7 where said upper chucking portion being movable between said loading position and said clamping position using a plurality of hydraulic cylinders.

9. The apparatus for manufacturing a recuperator core of claim 1 wherein said lower or inner chucking portion being movable between said retracted chucking position and said expanded chucking position using a hydraulic cylinder.

10. A manufacturing system adapted for making a recuperator core having a circular configuration, said recuperator core defining an axis "A" and being made up of a plurality of cells and an inner sealing member or ring, said inner sealing member or ring having a circular configuration and defining a first end and a second end, said manufacturing system comprising:

an input end having a supply of the plurality of cells provide thereto;

an assembly station having a table and defining an axis coinciding with said axis "A" of said recuperator core during said manufacturing of said recuperator core, said table including a lower or inner chucking portion having an axis coinciding with said axis "A" and being movable between a lower chucking position and an upper chucking position a retracted position and an expanded position, an upper chucking portion being positioned about said lower or inner chucking portion, said upper chucking portion having a stacking portion being movable between a loading position and a clamping position, said upper chucking portion being rotatable between a first chucking position and a second chucking position;

a welding station being operatively connected to said assembly station, said welding station being capable of performing a tack welding operation and a lineal welding operation;

an output end having a location for placing the recuperator core after said assembly and welding thereof.

11. The manufacturing system adapted for making a recuperator core of claim 10 wherein said clamping position of said stacking portion of said upper chucking portion includes a low pressure clamping position, a medium pressure clamping position and a high pressure clamping position.

* * * * *